United States Patent [19]

McKee

[11] Patent Number: 5,082,361
[45] Date of Patent: Jan. 21, 1992

[54] HORIZONTALLY AND VERTICALLY MOVABLE REMOTE CONTROLLED MIRROR UNIT FOR COMMERCIAL VEHICLES

[76] Inventor: Clyde M. McKee, 22175 Bernard St., Taylor, Mich. 48180

[21] Appl. No.: 668,349

[22] Filed: Mar. 11, 1991

[51] Int. Cl.$^5$ ............................. G02B 7/18; B60K 1/06
[52] U.S. Cl. ...................................... 359/876; 248/485
[58] Field of Search ............... 350/637, 636, 634, 633, 350/632; 248/476, 479, 484, 485, 486, 487

[56] References Cited

U.S. PATENT DOCUMENTS

| | | | |
|---|---|---|---|
| 2,751,817 | 6/1956 | Lapekas | 248/486 |
| 3,371,903 | 3/1968 | Thompson | 248/486 |
| 3,480,355 | 11/1969 | Smith . | |
| 3,492,065 | 1/1970 | Kurz | 350/633 |
| 3,537,778 | 11/1970 | Kurz | 350/633 |
| 4,056,253 | 11/1977 | Repay et al. | 350/364 |
| 4,258,983 | 3/1981 | Johnson | 248/486 |
| 4,295,708 | 10/1981 | Albrecht et al. . | |
| 4,609,265 | 9/1986 | McKee et al. . | |
| 4,623,115 | 11/1986 | Brester | 248/479 |
| 4,648,693 | 3/1987 | Losch . | |
| 4,701,037 | 10/1987 | Bramer . | |

FOREIGN PATENT DOCUMENTS 3212356 10/1983 Fed. Rep. of Germany ...... 350/632

Primary Examiner—Jon W. Henry
Attorney, Agent, or Firm—Gifford, Groh, Sprinkle, Patmore and Anderson

[57] ABSTRACT

A remote controlled mirror unit for mounting on a commercial vehicle such as a truck or a bus includes a mirror assembly comprising a mirror housing, a multi-directional mirror drive mounted within said housing, and a mirror mounted to said mirror drive. The mirror unit further includes a mirror assembly support bracket comprising an upper horizontal bracket and a lower horizontal bracket. The mirror is capable of movement about both a vertical and a horizontal axis. The mirror is removably detachable from the mirror drive. The mirror assembly is pivotably associated with the mirror assembly support bracket along an axis whereby the mirror assembly is pivotable about the axis.

6 Claims, 2 Drawing Sheets

HORIZONTALLY AND VERTICALLY MOVABLE REMOTE CONTROLLED MIRROR UNIT FOR COMMERCIAL VEHICLES

This is a continuation of copending application Ser. No. 07/373,324 filed on June 28, 1989 now abandoned.

BACKGROUND OF THE INVENTION

I. Field of the Invention

The present invention relates generally to mirrors for commercial vehicles. More particularly, the present invention relates to a horizontally and vertically movable remote controlled mirror unit for a commercial vehicle such as a truck or a bus.

II. Description of the Relevant Art

With the ever-increasing application of commercial-sized vehicles to a variety of tasks, the dangers inherently associated with the movement of such large vehicles concurrently increases. In backing-up, turning or lane changing maneuvers of large vehicles considerable risk is involved because of the driver's limited view.

In response to this, trucks and buses are often fitted with large, flat mirrors to either side of the truck cab. These mirrors are known as the so-called "California mirror".

The application of these mirrors resolves certain safety problems by giving the driver of the commercial vehicle a wider field of view. However, the view is still limited particularly with respect to trailer-hauling trucks. The trailers of such rigs cut off the view of the driver when, for example, going around a corner.

The problem of the flat mirror is not limited to trucks. Applied to non-trailering vehicles such as buses, the flat mirror provides a view to the rear of the bus, but fails to provide a view to the sides of the bus, thus severely restricting its utility.

In response to this inherent weakness, one or more concave mirrors are often fitted by the flat mirrors or to the front of the vehicle's fenders or both. While more or less solving the immediate problems of side-to-side vision, this multi-mirrored arrangement creates new problems in that the driver's field of view is terribly complicated by the complex and confusing array of mirrors.

Accordingly, the prior approaches to solving the problem of providing a rear view mirror system that is both non-intrusive and effective have failed.

SUMMARY OF THE PRESENT INVENTION

The present invention provides a remote controlled mirror unit for a commercial vehicle such as a truck or a bus. The mirror unit includes a mirror assembly comprising a mirror housing, a multi-directional mirror drive mounted within said housing, a mirror mounted to said mirror drive. The mirror may either be planar or convex. The mirror unit also includes a mirror assembly support structure.

The housing comprises an oblong box having a base, a top side, a bottom side, a first side and a second side. The base and the sides define a cavity therein. The housing may be composed of a polymerized material or a metal.

The mirror drive is remote controlled from a place convenient to the driver of the vehicle. The drive includes two axes, thus allowing movement of the attached mirror about both a vertical axis and a horizontal axis. The drive is fitted more or less centrally within the cavity of the housing.

The mirror is removably attached to the drive. Removal of the mirror facilitates easy replacement of the mirror or interchanging of the mirror with a different type of mirror. Removal also allows for the clearing of snow, ice or debris that may gather in the mirror cavity of the housing.

The mirror assembly is attached to a mirror support fixed to the commercial vehicle. The support comprises generally a pair of vertical support brackets, one upper and one lower. The mirror housing is fitted to the brackets by an upper flange that interconnects the upper bracket with the top side of the mirror housing and a lower flange that interconnects the lower bracket with the bottom side of the mirror housing. The upper and lower flanges are pivotably attached to the respective top and bottom sides of the housing along an axis whereby the mirror assembly is pivotable about the axis through at least 180 degrees with respect to the upper and lower bracket.

The mirror according to the present invention provides numerous advantages over known mirrors for commercial vehicles in that its movement on vertical and horizontal axes allows the driver the greatest possible vision with the fewest number of mirrors. This system improves significantly over what is known by giving the driver, via remote controls, power over the broadest field of view.

Other advantages and features of the present invention will become more apparent from the following detailed description when read in conjunction with the accompanying drawing.

BRIEF DESCRIPTION OF THE DRAWING

The present invention will be more fully understood by reference to the following detailed description of the preferred embodiments of the present invention when read in conjunction with the accompanying drawing, in which like reference characters refer to like parts throughout the views, and in which.

DETAILED DESCRIPTION OF THE PREFERRED EMBODIMENT OF THE PRESENT INVENTION

Embodiment of the Present Invention

Figure 1:
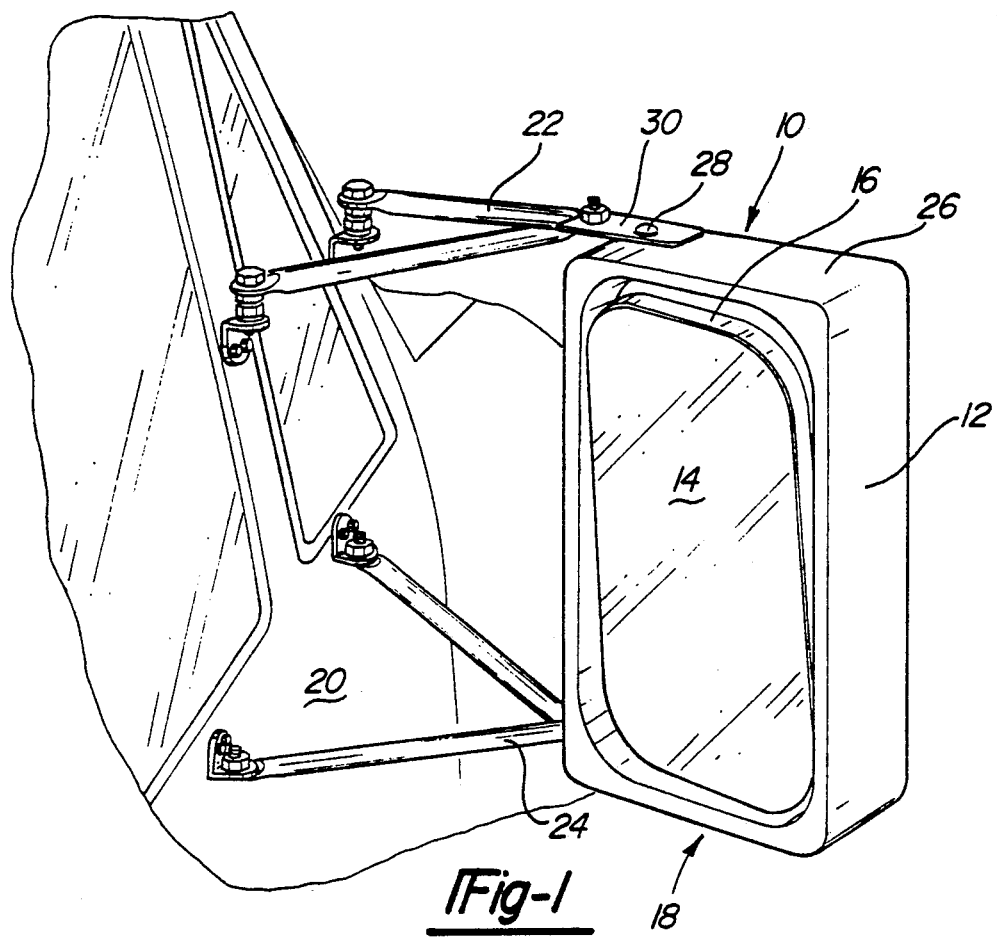
FIG. 1 is a perspective view of a mirror according to the present invention fixed to a commercial vehicle.

The drawing discloses the preferred embodiment of the present invention. While the configuration according to the illustrated embodiment is preferred, it is envisioned that alternate configurations of the present invention may be adopted without deviating from the invention as portrayed. The preferred embodiment is discussed hereafter.

Referring to FIG. 1, a mirror unit according to the present invention is shown and is generally indicated as 10. The mirror unit 10 includes a mirror housing 12 and a mirror portion 14.

The housing 12 may be composed of a plastic or a vinyl, or may be a metal.

The mirror portion 14 includes a mirror backing 16. The mirror portion 14 as illustrated is substantially planar, although a convex mirror 15 (FIG. 2) may be used as preferred.

The mirror portion 14 and housing comprise a mirror assembly collectively indicated as 18. The mirror assembly is attached to a commercial vehicle 20 such as a truck or a bus by a pair of brackets, an upper bracket 22 and a lower bracket 24. Although a pair of brackets 22, 24 are illustrated, other support structures having alternate configurations are applicable.

The upper bracket 22 includes a cantilevered fastener 30 that is itself attached to a top side 26 of the housing 12 by an upper flange 28. Although not seen by this view, a like flange is included at the end of the lower bracket 24 for attachment to the bottom side of the housing 12 by a like fastener.

Figure 2:
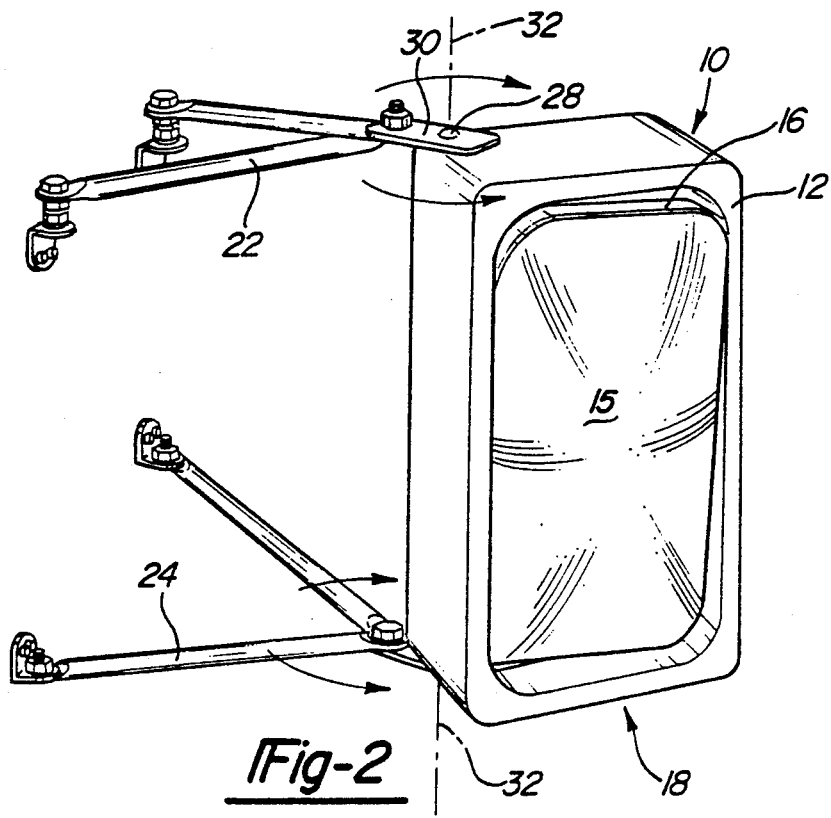
FIG. 2 is a perspective view similar to the view of FIG. 1 illustrating the mirror assembly pivoted from the position of FIG. 1.

With reference to FIG. 2, the upper fastener 28 and the lower fastener (not visible) pivotably associate the mirror assembly 18 to the upper flange 30 and the lower flange (not visible) along an axis indicated as 32 whereby the mirror assembly 18 is pivotable thereabout through 180 degrees of travel. As illustrated in FIG. 2, the mirror assembly 18 has been pivotably shifted relative to its position illustrated in FIG. 1.

Figure 3:
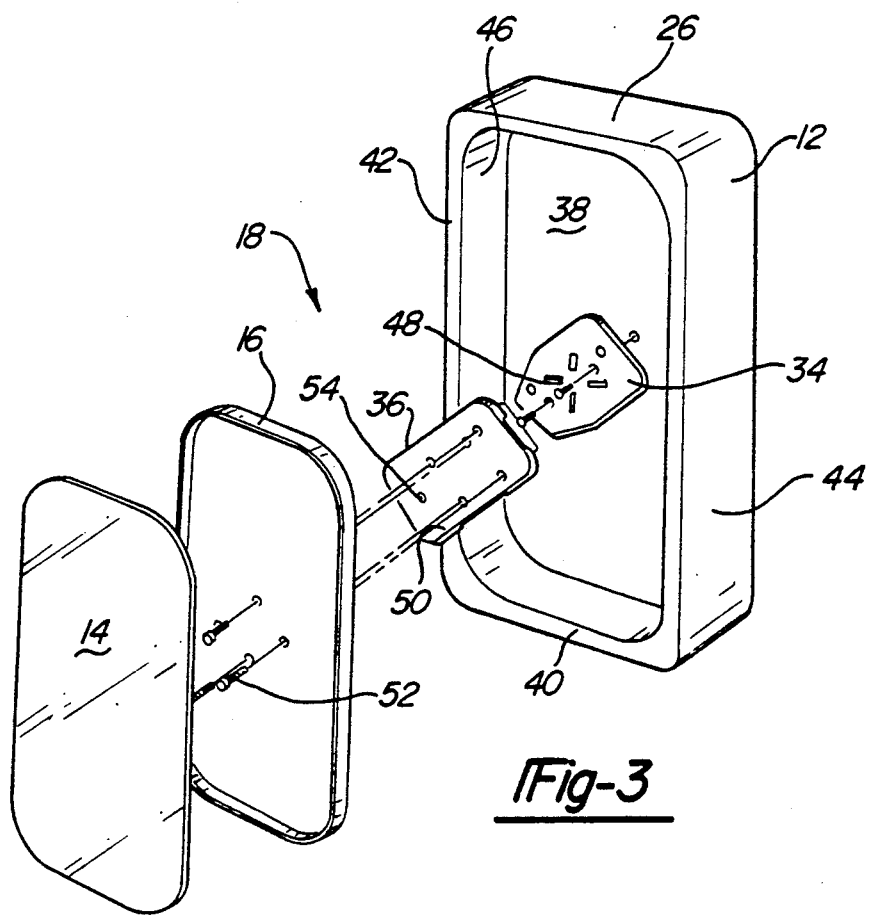
FIG. 3 is an exploded perspective view of the mirror assembly.

Referring to FIG. 3, an exploded perspective view of the mirror assembly is illustrated, generally indicated as 18. The assembly includes the mirror housing 12, a mirror drive support plate 34, a mirror drive 36, the mirror backing 16, and the mirror 14.

As may be readily understood from this view, the mirror housing 12 includes a base 38, the top side 26, a bottom side 40, a first side 42 and a second side 44. The base 38 and the sides 26, 40, 42, 44 define a mirror-receiving cavity 46 therein. The cavity is large enough to accommodate the mirror 14 in all of its vertical and horizontal positions.

The drive support plate 34 is centrally mounted to the base 38. The mirror drive 36 is movably mounted thereto. The plate 34 is fixed, and the drive 36 moves horizontally and vertically relative thereto by interattachment with four slots 48 defined in the plate 34 of four drive pins (not visible) acting on the underside of the drive 36.

The drive 36 includes a mounting plate 50 to which the backing 16 and its associated mirror 14 are removably attached. A number of studs 52 fitted through the backing 16 releasably interact with an equal number of locking slots 54 defined in the mounting plate 50. The removability of the mirror 14 and the backing 16 facilitate removal for the clearing of snow, ice and debris from within the cavity 46 of the housing 12.

Figure 4:
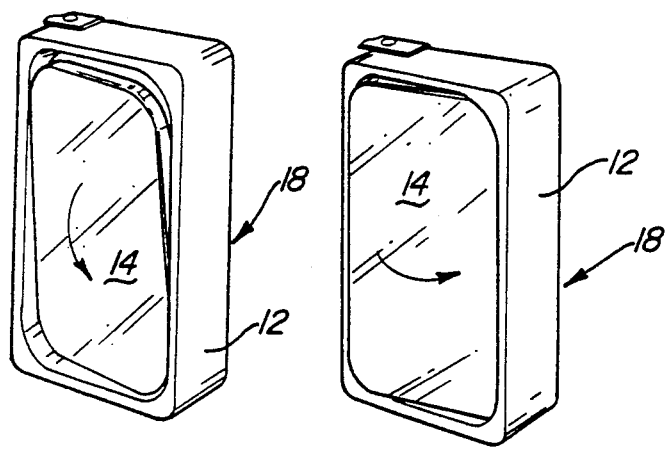
FIG. 4 is a multiple view of mirror assemblies illustrating the possible different positions of the mirror relative to the housing.

The four-way movement of the assembly 18 is illustrated in FIG. 4. With reference thereto, four positions of the mirror 14 relative to the housing 12 are illustrated thereby showing how an operator of a vehicle may selectively adjust the mirror 14 without leaving his seated position to simultaneously gather a complete view of both objects to the rear of the vehicle and objects to the side of the vehicle.

Having described my invention, however, many modifications thereto will become apparent to those skilled in the art to which it pertains without deviation from the spirit of the invention as defined by the scope of the appended claims.

I claim:

1. A remote controlled mirror unit mounted on a commercial vehicle comprising:
    a mirror assembly;
    a support structure for mounting said mirror assembly to said vehicle, said support structure including two spaced apart brackets;
    said mirror assembly including a mirror housing, a multi-directional mirror drive mounted in said housing, and a mirror mounted to said mirror drive;
    said mirror drive including means for moving said mirror about both a vertical axis and a horizontal axis;
    said mirror assembly is pivotably associated with said brackets along an axis whereby said mirror assembly is pivotable about said axis; and
    said assembly is pivotable about said axis through at least 180 degrees with respect to said spaced apart brackets.

2. A remote controlled mirror unit mounted on a commercial vehicle comprising:
    a mirror assembly;
    a support structure for mounting said mirror assembly to said vehicle, said support structure including two spaced apart brackets;
    said mirror assembly including a mirror housing, a multi-directional mirror drive mounted in said housing, and a mirror mounted to said mirror drive;
    said mirror drive including means for moving said mirror about both a vertical axis and a horizontal axis;
    said mirror housing is one-pieced;
    said one-pieced housing includes a base, a bottom side, a top side, a first side and a second side, said base and said sides defining a mirror and mirror drive receiving cavity;
    said two spaced apart brackets comprise an upper horizontal bracket and a lower horizontal bracket; and
    said upper horizontal bracket includes an upper flange pivotably mounted to said top side of said one-pieced housing.

3. The remote controlled mirror unit of claim 2 wherein said lower horizontal bracket includes a lower flange pivotably mounted to said bottom side of said one-pieced housing.

4. The remote controlled mirror unit of claim 3 wherein said upper and lower flanges are connected to said housing along an axis whereby said mirror assembly is pivotable about said axis.

5. A remote controlled mirror unit mounted on a commercial vehicle comprising:
    a mirror assembly;
    a support structure for mounting said mirror assembly to said vehicle, said support structure including two spaced apart brackets;
    said mirror assembly pivotably connected to said brackets along an axis whereby said mirror assembly is pivotable about said axis;
    said mirror assembly including a mirror housing, a multi-directional mirror drive mounted in said housing, and a mirror mounted to said mirror drive;
    said mirror drive including means for moving said mirror about both a vertical axis and a horizontal axis;
    said mirror is substantially convex; and said assembly is pivotable about said axis through at least 180 degrees with respect to said spaced apart brackets.

6. A remote controlled mirror unit mounted on a commercial vehicle comprising:

a mirror assembly;

a support structure for mounting said mirror assembly to said vehicle, said support structure including two parallel spaced apart brackets;

said mirror assembly pivotably connected to said brackets along an axis whereby said mirror assembly is pivotable about said axis;

said mirror assembly including a mirror housing, a multi-directional mirror drive mounted in said housing, and a mirror mounted to said mirror drive;

said mirror drive including means for moving said mirror about both a vertical axis and a horizontal axis;

said mirror housing is one-pieced;

said one-pieced housing includes a base, a bottom side, a top side, a first side, and a second side, said base and said sides defining a mirror and mirror drive receiving cavity;

said two spaced apart brackets comprise an upper horizontal bracket and a lower horizontal bracket; and said upper horizontal bracket includes an upper flange pivotably mounted to said top side of said one-pieced housing, said lower horizontal bracket includes a lower flange pivotably mounted to said bottom side of said one-pieced housing, said upper and lower flanges being connected to said housing along an axis whereby said mirror assembly is pivotable about said axis.

* * * * *